(12) United States Patent
Ozaki et al.

(10) Patent No.: US 12,247,790 B2
(45) Date of Patent: Mar. 11, 2025

(54) HEAT STORAGE DEVICE

(71) Applicant: Panasonic Holdings Corporation, Osaka (JP)

(72) Inventors: Ryuichi Ozaki, Osaka (JP); Tatsuya Nakamura, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 210 days.

(21) Appl. No.: 18/001,986

(22) PCT Filed: May 19, 2021

(86) PCT No.: PCT/JP2021/019060
§ 371 (c)(1),
(2) Date: Dec. 15, 2022

(87) PCT Pub. No.: WO2022/004174
PCT Pub. Date: Jan. 6, 2022

(65) Prior Publication Data
US 2023/0235970 A1    Jul. 27, 2023

(30) Foreign Application Priority Data

Jun. 30, 2020 (JP) ................................ 2020-113317

(51) Int. Cl.
F28D 20/00 (2006.01)

(52) U.S. Cl.
CPC .. *F28D 20/0034* (2013.01); *F28D 2020/0047* (2013.01); *F28D 2020/0065* (2013.01)

(58) Field of Classification Search
CPC ......... F28D 20/0034; F28D 2020/0047; F28D 2020/0065; F28D 20/02; F28F 19/02; F28F 19/06

USPC .................................................... 165/104.17
See application file for complete search history.

(56) References Cited

U.S. PATENT DOCUMENTS

| | | | |
|---|---|---|---|
| 2014/0030848 A1 | 1/2014 | Ikemoto et al. | |
| 2016/0060765 A1* | 3/2016 | Mizuno | C23C 22/44 |
| | | | 427/309 |
| 2018/0193962 A1* | 7/2018 | Ogura | F28F 19/06 |

FOREIGN PATENT DOCUMENTS

| | | | |
|---|---|---|---|
| DE | 202010010188 U1 * | 11/2010 | ............. F28F 19/02 |
| EP | 659519 A1 * | 6/1995 | ......... B23K 35/3605 |
| JP | S58-129479 A | 9/1983 | |
| JP | 2000-248399 A | 9/2000 | |
| JP | 2006-284031 A | 10/2006 | |

(Continued)

OTHER PUBLICATIONS

International Search Report dated Aug. 10, 2021 issued in International Patent Application No. PCT/JP2021/019060, with English translation.

*Primary Examiner* — Steve S Tanenbaum
(74) *Attorney, Agent, or Firm* — Rimon P.C.

(57) ABSTRACT

A heat storage device of the present disclosure includes a latent heat storage material and a container. The latent heat storage material is water-soluble. The container houses the latent heat storage material and is formed of a main material being aluminum or an aluminum alloy. The container has a joining portion and a first coating. The first coating covers at least the joining portion on an inner surface of the container. On a surface of the first coating, a first element and fluorine are present. The first element is an element other than aluminum and having a lower ionization tendency than potassium.

11 Claims, 2 Drawing Sheets

(56) References Cited

FOREIGN PATENT DOCUMENTS

| | | | |
|---|---|---|---|
| JP | 2012-136689 A | | 7/2012 |
| JP | 2013-006981 A | | 1/2013 |
| JP | 2014088980 A | * | 5/2014 |
| JP | 2018-109424 A | | 7/2018 |
| WO | WO-2018135658 A1 | * | 7/2018 ........... B23K 1/0012 |

* cited by examiner

HEAT STORAGE DEVICE

CROSS REFERENCE TO RELATED APPLICATIONS

This application is the U.S. National Phase under 35 U.S.C. § 371 of International Patent Application No. PCT/JP2021/019060, filed on May 19, 2021 which in turn claims the benefit of Japanese Patent Application No. 2020-113317, filed on Jun. 30, 2020, the entire disclosures of which Applications are incorporated by reference herein.

TECHNICAL FIELD

The present disclosure relates to a heat storage device.

BACKGROUND ART

Heat storage devices using a water-soluble latent heat storage material have been conventionally known.

For example, Patent Literature 1 describes a heat storage device including a plurality of heat storage bodies filled with a latent heat storage material containing a hydrate as a main component. The heat storage body is formed of a heat storage container and the latent heat storage material. Aluminum oxide is applicable as the material of the heat storage container.

Further, Patent Literature 2 describes a vacuum insulation member including a heat storage material and a gas barrier film. In this vacuum insulation member, the heat storage material is sealed inside the gas barrier film under reduced pressure. The heat storage material is a hydrate such as sodium acetate hydrate. In the gas barrier film, for example, a sealing layer, a gas barrier layer, and a resin film layer are laminated. The gas barrier layer is a metal foil or a vapor-deposited film, and the gas barrier layer can contain aluminum.

Patent Literature 3 describes a cold storage device including a double container and a cold storage agent. The double container is configured by seaming an outer container and an inner container that are made of metal with a flange. The double container is filled with a cold storage agent, which freezes at a predetermined temperature, and sealed. The outer container and the inner container are each formed of a thin aluminum alloy sheet having anodic oxide coatings on its front and back surfaces.

CITATION LIST

Patent Literature

Patent Literature 1: JP 2006-284031 A
Patent Literature 2: JP 2018-109424 A
Patent Literature 3: JP S58-129479 U

SUMMARY OF INVENTION

Technical Problem

The present disclosure provides a heat storage device that is, when a container housing a latent heat storage material is formed of a main material being aluminum or an aluminum alloy and has a joining portion, advantageous from the viewpoint of stability of the supercooling of the latent heat storage material.

Solution to Problem

A heat storage device according to the present disclosure includes:

a water-soluble latent heat storage material; and
a container housing the latent heat storage material and formed of a main material being aluminum or an aluminum alloy, wherein
the container has a joining portion and a first coating, the first coating covering at least the joining portion on an inner surface of the container, and
on a surface of the first coating, a first element and fluorine are present, the first element being other than aluminum and having a lower ionization tendency than potassium.

Advantageous Effects of Invention

The above heat storage device is advantageous from the viewpoint of stability of the supercooling of the latent heat storage material.

DESCRIPTION OF EMBODIMENTS

Figure 1:
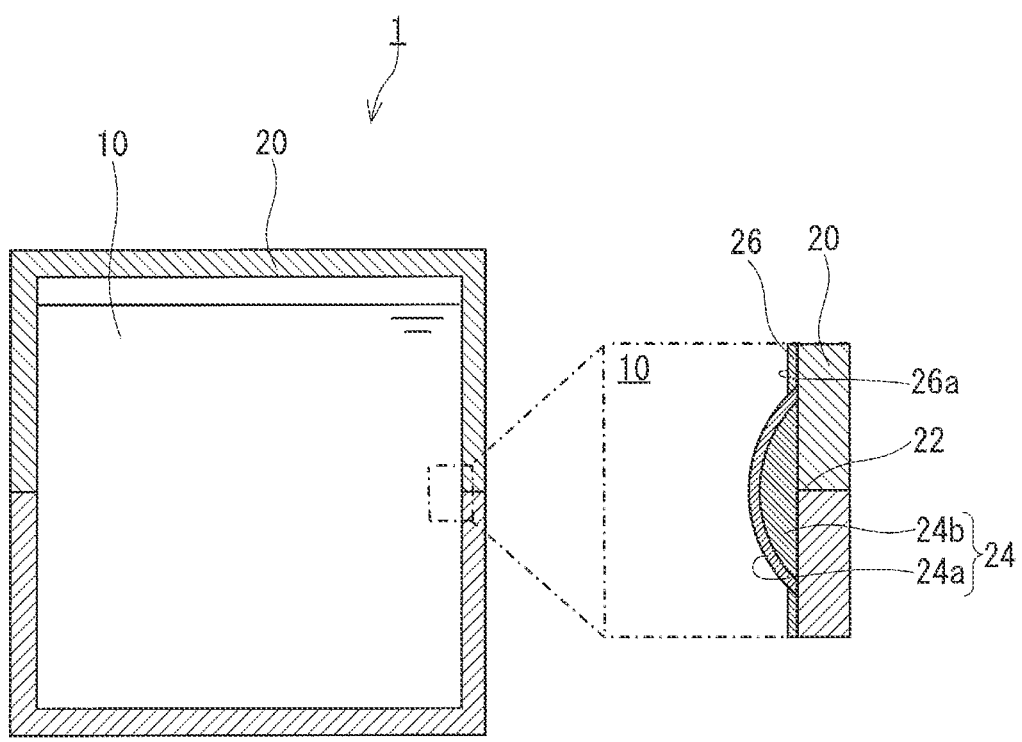
FIG. 1 is a cross-sectional view of a heat storage device of Embodiment 1.

Findings on Which the Present Disclosure is Based

It is conceivable, in a heat storage device, to use, as a container for housing a latent heat storage material, a container formed of a main material being aluminum or an aluminum alloy and having a joining portion. In this case, an auxiliary agent such as a flux is sometimes used to form the joining portion. The study by the present inventors has newly found that the use of the auxiliary agent such as a flux in the above case can impair the stability of the supercooling of the latent heat storage material housed in the container.

Elution of aluminum ions from the container into the latent heat storage material is considered to easily impair the stability of the supercooling of the latent heat storage material. In view of this, to suppress elution of aluminum ions from the container into the latent heat storage material, it is conceivable to form a passive state on the inner surface of the container through a treatment such as an anodized aluminum treatment or a boehmite treatment. On the other hand, it is considered that in a portion on the inner surface of the container where the auxiliary agent such as a flux has been used for forming the joining portion, a passive state is less likely to be formed, and that the auxiliary agent such as a flux dissolves in the latent heat storage material to cause exposure of the main material of the container to the latent heat storage material. This is considered to cause elution of aluminum ions from the vicinity of the joining portion into the latent heat storage material to impair the stability of the supercooling of the latent heat storage material. In view of this, as a result of extensive trial and error, the present inventors have newly found that the stability of the supercooling of the latent heat storage material can be improved by the presence of a predetermined element on the surface of the coating covering the joining portion, and have devised the heat storage device of the present disclosure.

Outline of One Aspect According to the Present Disclosure

A heat storage device according to a first aspect of the present disclosure includes:

a water-soluble latent heat storage material; and a container housing the latent heat storage material and formed of a main material being aluminum or an aluminum alloy, wherein the container has a joining portion and a first coating, the first coating covering at least the joining portion on an inner surface of the container, and on a surface of the first coating, a first element and fluorine are present, the first element being other than aluminum and having a lower ionization tendency than potassium.

According to the first aspect, on the surface of the first coating covering at least the joining portion, the first element and fluorine are present. Consequently, the first coating is less likely to dissolve in the water-soluble latent heat storage material, thereby facilitating suppression of elution of aluminum ions from the vicinity of the joining portion into the latent heat storage material. This facilitates stabilization of the supercooling of the latent heat storage material in the heat storage device according to the first aspect.

In a second aspect of the present disclosure, for example, in the heat storage device according to the first aspect, the first coating may have a potassium-rich portion that is positioned closer to the joining portion in a thickness direction of the first coating than the surface is, the potassium-rich portion having a higher concentration of potassium on an atomic percentage basis than the surface. According to the second aspect, the surface of the first coating has a lower concentration of potassium than the potassium-rich portion. Consequently, the first coating is much less likely to dissolve in the latent heat storage material even when the first coating is in contact with the latent heat storage material. This more reliably suppresses elution of aluminum ions from the vicinity of the joining portion into the latent heat storage material, thereby facilitating stabilization of the supercooling of the latent heat storage material.

In a third aspect of the present disclosure, for example, in the heat storage device according to the first aspect or the second aspect, a fluoride of the first element may have a lower solubility in water at 20° C. than potassium fluoride. According to the third aspect, the first coating is much less likely to dissolve in the latent heat storage material even when the first coating is in contact with the latent heat storage material. This more reliably suppresses elution of aluminum ions from the vicinity of the joining portion into the latent heat storage material, thereby facilitating stabilization of the supercooling of the latent heat storage material.

In a fourth aspect of the present disclosure, for example, in the heat storage device according to any one of the first aspect to the third aspect, the first element may be at least one selected from the group consisting of sodium, calcium, magnesium, zinc, and iron. According to the fourth aspect, the first coating is much less likely to dissolve in the latent heat storage material even when the first coating is in contact with the latent heat storage material. This more reliably suppresses elution of aluminum ions from the vicinity of the joining portion into the latent heat storage material, thereby facilitating stabilization of the supercooling of the latent heat storage material.

In a fifth aspect of the present disclosure, for example, in the heat storage device according to any one of the first aspect to the fourth aspect, the container may have, on the inner surface of the container, a second coating away from the joining portion. On a surface of the second coating, at least one selected from the group consisting of aluminum oxide, aluminum hydroxide, hydrated alumina, and a substance containing a second element and fluorine may be present, the second element having a lower ionization tendency than potassium. According to the fifth aspect, even when the second coating is in contact with the latent heat storage material, the second coating is less likely to dissolve in the latent heat storage material. This suppresses elution of aluminum ions from the main material of the container into the latent heat storage material, thereby facilitating stabilization of the supercooling of the latent heat storage material.

In a sixth aspect of the present disclosure, for example, in the heat storage device according to the fifth aspect, on the surface of the second coating, the substance containing the second element and fluorine may be present. A fluoride of the second element may have a lower solubility in water at 20° C. than potassium fluoride. According to the sixth aspect, the second coating is much less likely to dissolve in the latent heat storage material even when the second coating is in contact with the latent heat storage material. This more reliably suppresses elution of aluminum ions from the main material of the container into the latent heat storage material, thereby facilitating stabilization of the supercooling of the latent heat storage material.

In a seventh aspect of the present disclosure, for example, in the heat storage device according to the fifth aspect, on the surface of the second coating, the substance containing the second element and fluorine may be present. The second element may be at least one selected from the group consisting of sodium, calcium, magnesium, zinc, and iron. According to the seventh aspect, the second coating is much less likely to dissolve in the latent heat storage material even when the second coating is in contact with the latent heat storage material. This more reliably suppresses elution of aluminum ions from the main material of the container into the latent heat storage material, thereby facilitating stabilization of the supercooling of the latent heat storage material.

In an eighth aspect of the present disclosure, for example, in the heat storage device according to any one of the first aspect to the seventh aspect, the latent heat storage material may contain, as a main component, a metal salt or a hydrate of a metal salt. The eighth aspect facilitates stabilization of the supercooling of the latent heat storage material.

In a ninth aspect of the present disclosure, for example, in the heat storage device according to the eighth aspect, the latent heat storage material may contain sodium acetate as the main component. The ninth aspect more reliably facilitates stabilization of the supercooling of the latent heat storage material.

Embodiments will be described below in detail with reference to the drawings. The following embodiments are merely examples, and the present disclosure is not limited to the following embodiments.

Embodiment 1

FIG. 1 is a cross-sectional view of a heat storage device 1 of Embodiment 1. As shown in FIG. 1, the heat storage device 1 includes a latent heat storage material 10 and a container 20. The latent heat storage material 10 is water-soluble. The container 20 houses the latent heat storage material 10 and is formed of a main material being aluminum or an aluminum alloy. For example, the main material has the largest mass in the container 20. The container 20 has a joining portion 22 and a first coating 24. The joining portion 22 is, for example, a portion formed by joining separate members by a method such as brazing or welding. The first coating 24 covers at least the joining portion 22 on the inner surface of the container 20. On a surface 24a of the first coating 24, a first element and fluorine are present. The first element has a lower ionization tendency than potassium. The first element is an element other than aluminum.

The heat storage device 1 typically stores latent heat by utilizing supercooling of the latent heat storage material 10. Accordingly, a stable supercooling of the latent heat storage material 10 is advantageous to the heat storage device 1.

As shown in FIG. 1, the first coating 24 is, for example, in contact with the latent heat storage material 10. Owing to the first element and fluorine present on the surface 24a, a substance that is less likely to dissolve in the latent heat storage material 10 is easily present on the surface 24a. Consequently, the first coating 24 is less likely to dissolve in the water-soluble latent heat storage material 10, thereby facilitating suppression of elution of aluminum ions from the vicinity of the joining portion 22 into the latent heat storage material 10. This facilitates stabilization of the supercooling of the latent heat storage material 10.

As shown in FIG. 1, the first coating 24 has, for example, a potassium-rich portion 24b. The potassium-rich portion 24b is positioned closer to the joining portion 22 in the thickness direction of the first coating 24 than the surface 24a is. In addition, the potassium-rich portion 24b has a higher concentration of potassium on an atomic percentage basis than the surface 24a. In other words, the surface 24a has a lower concentration of potassium than the potassium-rich portion 24b. Consequently, the first coating 24 is much less likely to dissolve in the latent heat storage material 10 even when the first coating 24 is in contact with the latent heat storage material 10. This more reliably suppresses elution of aluminum ions from the vicinity of the joining portion 22 into the latent heat storage material 10, thereby facilitating stabilization of the supercooling of the latent heat storage material. In addition, owing to the potassium-rich portion 24b positioned close to the joining portion 22, the joining portion 22 is kept in a desired state, thereby facilitating the strength of the joining portion 22 to be kept high.

The first element is not limited to any specific element as long as the first element has a lower ionization tendency than potassium. The solubility of the fluoride of the first element in water at 20° C. is not limited to any specific value. The fluoride of the first element has, for example, a lower solubility in water at 20° C. than potassium fluoride. In this case, owing to the first element and fluorine present on the surface 24a of the first coating 24, a substance that is less likely to dissolve in the latent heat storage material 10 is easily present on the surface 24a. Consequently, the first coating 24 is much less likely to dissolve in the latent heat storage material 10 even when the first coating 24 is in contact with the latent heat storage material 10. This more reliably suppresses elution of aluminum ions from the vicinity of the joining portion 22 into the latent heat storage material 10, thereby facilitating stabilization of the supercooling of the latent heat storage material 10.

The solubility of potassium fluoride in water at 20° C. is 949 g/L. The sign g/L means gram per liter. The solubility of the fluoride of the first element in water at 20° C. is, for example, 400 g/L or less, and may be 300 g/L or less, 200 g/L or less, 100 g/L or less, or 50 g/L or less.

The first element is, for example, at least one selected from the group consisting of sodium, calcium, magnesium, zinc, and iron. In this case, the first coating 24 is much less likely to dissolve in the latent heat storage material 10 even when the first coating 24 is in contact with the latent heat storage material 10. This more reliably suppresses elution of aluminum ions from the vicinity of the joining portion 22 into the latent heat storage material 10, thereby facilitating stabilization of the supercooling of the latent heat storage material. The solubilities of the fluorides of these elements in water at 20° C. are shown in Table 1.

TABLE 1

| Fluoride name | Chemical formula | Solubility in water at 20° C. [g/L] |
| --- | --- | --- |
| Sodium fluoride | NaF | 40 |
| Calcium fluoride | $CaF_2$ | 0.016 |
| Magnesium fluoride | $MgF_2$ | 0.073 |
| Zinc fluoride | $ZnF_2$ | 0.00052 |
| Iron fluoride | $FeF_3$ | 0.91 |
| Potassium fluoride | KF | 949 |

The concentration of the first element in the surface 24a is not limited to any specific value. For example, a value PP/PFs is not limited to any specific value, where the value PP/PFs is obtained by dividing PP at % representing the concentration of the first element in the surface 24a by PFS at % representing the concentration of fluorine atoms in the surface 24a. The value PP/PFs is, for example, 0.015 or more and 0.30 or less. The value PP/PFs may be 0.018 or more. The value PP/PFs may be 0.295 or less. The concentration of a specific element in the surface 24a can be determined according to, for example, energy dispersive X-ray spectroscopy using a scanning electron microscope (SEM-EDX).

The concentration of potassium in the surface 24a is not limited to any specific value. The concentration of potassium in the surface 24a is, for example, 10 at % or less, and may be 5 at % or less or 3 at % or less. The concentration of potassium in the surface 24a may be 0 at %.

The concentration of potassium in the potassium-rich portion 24b is not limited to any specific value. For example, a value PK/PFR is not limited to any specific value, where the value PK/PFR is obtained by dividing PK at % representing the concentration of potassium atoms in the potassium-rich portion 24b by PFR at % representing the atomic number based concentration of fluorine atoms in the surface 24a. The value PK/PFR is, for example, 0.14 or more and 1 or less.

As shown in FIG. 1, the container 20 has, for example, a second coating 26. On the inner surface of the container 20, the second coating 26 is away from the joining portion 22. On a surface 26a of the second coating 26, at least one selected from the group consisting of aluminum oxide, aluminum hydroxide, hydrated alumina, and a substance containing a second element and fluorine is present. The second element has a lower ionization tendency than potassium.

As shown in FIG. 1, the second coating 26 is, for example, in contact with the latent heat storage material 10. Owing to the surface 26a having the structure as above, the second coating 26 is less likely to dissolve in the latent heat storage material 10 even when the second coating 26 is in contact with the latent heat storage material 10. This suppresses elution of aluminum ions from the main material of the container 20 into the latent heat storage material 10, thereby facilitating stabilization of the supercooling of the latent heat storage material 10.

On the surface 26a of the second coating 26, a substance containing the second element and fluorine is present, for example. The second element is not limited to any specific element as long as the second element has a lower ionization tendency than potassium. The solubility of the fluoride of the second element in water at 20° C. is not limited to any specific value. The fluoride of the second element has, for example, a lower solubility in water at 20° C. than potassium fluoride. In this case, the second coating 26 is much less likely to dissolve in the latent heat storage material 10 even when the second coating 26 is in contact with the latent heat storage material 10. This more reliably suppresses elution of aluminum ions from the main material of the container 20 into the latent heat storage material 10, thereby facilitating stabilization of the supercooling of the latent heat storage material 10.

The second element is, for example, at least one selected from the group consisting of sodium, calcium, magnesium, zinc, and iron. In this case, the second coating 26 is much less likely to dissolve in the latent heat storage material 10 even when the second coating 26 is in contact with the latent heat storage material 10. This more reliably suppresses elution of aluminum ions from the main material of the container 20 into the latent heat storage material 10, thereby facilitating stabilization of the supercooling of the latent heat storage material 10.

The second element may be an element of the same type as the first element, or may be an element of a different type from the first element.

The latent heat storage material 10 is not limited to any specific latent heat storage material as long as the latent heat storage material 10 is water-soluble. The latent heat storage material 10 contains, as a main component, a metal salt or a hydrate of a metal salt, for example. This facilitates the latent heat storage material 10 to have a desired supercooling stability. The term "main component" used herein means a component whose content is highest on a mass basis.

The metal salt may be a sodium salt, a lithium salt, a potassium salt, a calcium salt, a magnesium salt, a barium salt, an iron salt, or an aluminum salt.

The latent heat storage material 10 may contain sodium acetate as the main component. This more reliably facilitates the latent heat storage material 10 to have a desired supercooling stability.

The main component of the latent heat storage material 10 may be a predetermined hydrate. For example, the main component may be a hydrate of the above metal salt. Examples of the hydrate include sodium sulfate decahydrate, sodium hydrogen sulfate monohydrate, lithium chlorate trihydrate, lithium perchlorate trihydrate, potassium fluoride dihydrate, potassium fluoride tetrahydrate, calcium chloride dihydrate, calcium chloride tetrahydrate, calcium chloride hexahydrate, lithium nitrate trihydrate, sodium sulfate decahydrate, sodium carbonate heptahydrate, sodium carbonate decahydrate, calcium bromide dihydrate, disodium hydrogen phosphate dihydrate, disodium hydrogen phosphate heptahydrate, disodium hydrogen phosphate dodecahydrate, iron chloride tetrahydrate, iron chloride hexahydrate, sodium thiosulfate pentahydrate, magnesium sulfate heptahydrate, lithium acetate dihydrate, sodium hydroxide monohydrate, barium hydroxide monohydrate, barium hydroxide octahydrate, sodium pyrophosphate decahydrate, trisodium phosphate hexahydrate, trisodium phosphate octahydrate, and trisodium phosphate dodecahydrate.

The latent heat storage material 10 may further contain other components such as a stabilizer or water.

The heat storage device 1 may further include, for example, a supercooling release device (not shown). The supercooling release device operates to allow the supercooling of the latent heat storage material 10 to be released at a desired time. The configuration of the supercooling release device is not limited to any specific configuration as long as the supercooling of the latent heat storage material 10 can be released. For example, the supercooling release device generates a physical action for releasing the supercooling of the latent heat storage material 10. The physical action may be a movement or vibration of a predetermined object, or may be an electrical action.

An example of a method of manufacturing the heat storage device 1 will be described. First, the members constituting the container 20 are joined to each other to form the joining portion 22. The method of forming the joining portion 22 is not limited to any specific method. For example, the members are joined to each other by brazing. In the brazing, for example, a flux is applied onto portions of the members, where the portions define the joining portion 22. The flux contains, for example, potassium, aluminum, and fluorine. The flux contains, for example, a eutectic of $KAlF_4$ and $K_3AlF_6$. Subsequently, the temperature of the environment of the members constituting the container 20 is kept at a predetermined temperature or higher for a predetermined period. Thus, the components contained in the flux are melted, so that the members constituting the container 20 are joined to each other. Subsequently, the portion at which the members constituting the container 20 have been joined to each other is subjected to a heat treatment under predetermined conditions while being in contact with a liquid containing the first element. In the heat treatment, the temperature of the liquid is adjusted to, for example, 100° C. or higher. The period for the heat treatment is, for example, 1 minute to 3 hours. Thus, the container 20, which has the joining portion 22 and the first coating 24, is obtained. Subsequently, the latent heat storage material 10 is housed inside the container 20, and the heat storage device 1 is thus obtained. On the other hand, the latent heat storage material 10 may be used as the liquid containing the first element. In this case, the step of filling the container 20 with the latent heat storage material 10 after forming the first coating 24 may be omitted.

An example of a method of using the heat storage device 1 will be described. When heat is supplied to the heat storage device 1 from the outside of the heat storage device 1, the latent heat storage material 10 changes from a solid phase to a liquid phase. Subsequently, the supply of heat from the outside of the heat storage device 1 is stopped, and the temperature of the latent heat storage material 10 varies to a temperature lower than the melting point of the latent heat storage material 10. In this case, the latent heat storage material 10 is brought into a supercooled state while remaining in the liquid phase. Consequently, the latent heat storage material 10 stores latent heat while being in the liquid phase and in the supercooled state. The supercooling of the latent heat storage material 10 is released at a predetermined time. This solidifies the latent heat storage material 10, so that the latent heat is released outwards from the heat storage device 1.

Embodiment 2

Figure 2:
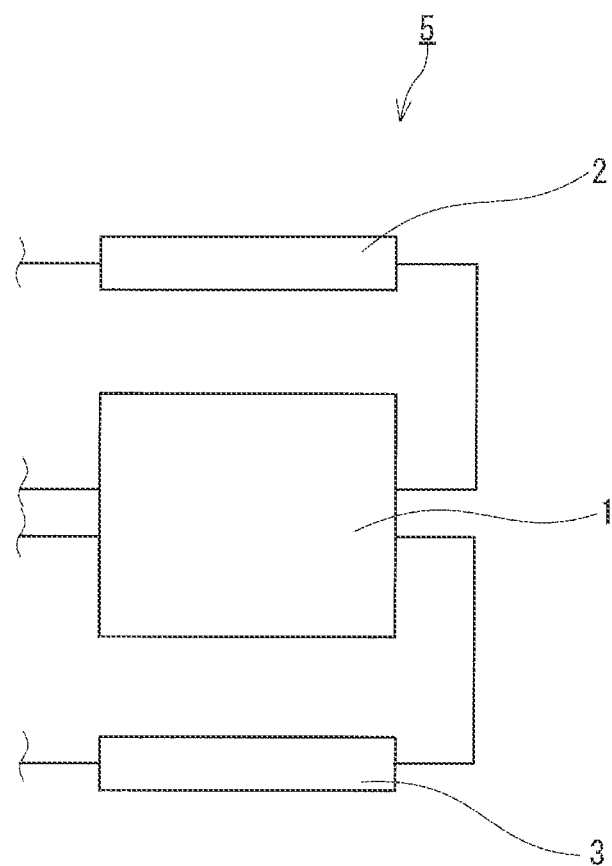
FIG. 2 is a diagram showing a heat utilization system according to Embodiment 2.

FIG. 2 is a diagram showing a heat utilization system 5 of Embodiment 2. The heat utilization system 5 includes the heat storage device 1, a heat source 2, and a heat exchanger 3. The heat storage device 1 is connected to the heat source 2 by a predetermined flow path such that the heat medium supplied from the heat source 2 is supplied to the heat storage device 1. In addition, the heat storage device 1 is connected to the heat exchanger 3 by a predetermined flow path such that the heat medium heated by the latent heat that has been released from the heat storage device 1 can be supplied to the heat exchanger 3.

The heat utilization system 5 can store, in the heat storage device 1, the heat of the heat source 2 in the form of latent heat, and can supply the latent heat to the heat exchanger 3 for utilization.

EXAMPLES

The present disclosure will be specifically described below based on examples. The present disclosure is not limited by the following examples.

Example 1

In a vial having a volume of 60 cm$^3$, sodium acetate, water, and 1,2-butanediol were put in predetermined quantities and mixed. In a thermostatic chamber adjusted to 75° C., the sodium acetate was dissolved to prepare a latent heat storage material. A flux was applied onto the surface of a sheet material of aluminum alloy A4343 by using a spray, and the sheet material was heated at a temperature of about 560° C. in a heating furnace under a nitrogen atmosphere to obtain a flux-coated aluminum alloy sheet material. The flux contained a eutectic of $KAlF_4$ and $K_3AlF_6$. Next, the flux-coated aluminum alloy sheet material was immersed in the latent heat storage material, and the vial was sealed. Subsequently, the latent heat storage material was heated for a predetermined period inside a thermostatic chamber adjusted to 120° C. Subsequently, the vial was taken out from the thermostatic chamber. Thus, a sample according to Example 1 was obtained.

Example 2

A latent heat storage material was prepared in a similar manner to that in Example 1. Further, a flux-coated aluminum alloy sheet material produced in a similar manner to that in Example 1 was heated for a predetermined period inside a thermostatic chamber adjusted to 120° C. while being immersed in an aqueous solution containing sodium acetate. Subsequently, the flux-coated aluminum alloy sheet material was taken out from the aqueous solution, washed with water, and dried. The flux-coated aluminum alloy sheet material thus treated was immersed in the latent heat storage material, and the vial was sealed. Thus, a sample according to Example 2 was obtained.

Comparative Example 1

A latent heat storage material was prepared in a similar manner to that in Example 1. Further, a flux-coated aluminum alloy sheet material produced in a similar manner to that in Example 1 was heated for a predetermined period inside a thermostatic chamber adjusted to 120° C. while being immersed in water. Subsequently, the flux-coated aluminum alloy sheet material was taken out of the heated water, washed with water, and dried. The flux-coated aluminum alloy sheet material thus treated was immersed in the latent heat storage material, and the vial was sealed. Thus, a sample according to Comparative Example 1 was obtained.

Comparative Example 2

A latent heat storage material was prepared in a similar manner to that in Example 1. A flux-coated aluminum alloy sheet material produced in a similar manner to that in Example 1 was immersed in the latent heat storage material without being subjected to any other treatment, and the vial was sealed. Thus, a sample according to Comparative Example 2 was obtained.

<Evaluation of Supercooling Stability>

In each of the samples according to the examples and the comparative examples, the latent heat storage material was crystallized by using a seed crystal of sodium acetate. Subsequently, the temperature of the latent heat storage material was kept at 30° C. inside a thermostatic chamber, and then the latent heat storage material was dissolved at 75° C. over 4 hours. Next, the temperature of the latent heat storage material was kept at −20° C. for 12 hours. At this time, whether the latent heat storage material had been crystalized was observed. The samples were each evaluated for 5 cycles. The results are shown in Table 2.

<Evaluation of Surface State of Flux-Coated Aluminum Alloy Sheet Material>

With use of a tabletop microscope TM4000Plus and an energy dispersive X-ray spectrometer AZtecOne both manufactured by Hitachi High-Tech Corporation, an SEM-EDX measurement was performed for each of the samples on the surface of the flux-coated aluminum alloy sheet material that had not yet been subjected to the evaluation of supercooling stability. On the basis of the results of the measurement, the content was determined for each of the elements in the surface of the flux-coated aluminum alloy sheet material in each of the samples. The results are shown in Table 3.

As shown in Table 2, in each of the samples according to Examples 1 and 2, the supercooling of the latent heat storage material was maintained at −20° C. for 12 hours in all the 5 cycles, suggesting that the supercooling of the latent heat storage material had a high stability. In contrast, in the sample according to Comparative Example 1, the supercooling of the latent heat storage material was able to be maintained for a predetermined period, but was not be able to be maintained for a period as long as 12 hours. Further, in the sample according to Comparative Example 2, the supercooling was hardly able to be maintained at −20° C.

As shown in Table 3, in each of the samples according to Examples 1 and 2, fluorine and sodium were present on the surface of the flux-coated aluminum alloy sheet material. In contrast, in each of the samples according to Comparative Examples 1 and 2, sodium was not present on the surface of the flux-coated aluminum alloy sheet material. It is considered that, in each of the samples according to Examples 1 and 2, owing to fluorine and an element such as sodium present on the surface of the flux-coated aluminum alloy sheet material, a substance that is less likely to dissolve in the latent heat storage material was present on the surface. Accordingly, it is understood that, in each of the samples according to Examples 1 and 2, the flux covering the aluminum alloy sheet material was less likely to dissolve in the latent heat storage material, and the supercooling of the latent heat storage material exhibited a high stability. In contrast, it is considered that, in the sample according to Comparative Example 1, the flux partially dissolved in the latent heat storage material and thus aluminum ions were eluted from the aluminum alloy. Accordingly, it is considered that, in the sample according to Comparative Example 1, the supercooling of the latent heat storage material was less likely to be maintained at −20° C. Further, it is considered that, in the sample according to Comparative Example 2 as well, the flux partially dissolved in the latent heat storage material and thus aluminum ions were eluted from the aluminum alloy into the latent heat storage material. In addition, it is considered that aluminum ions were eluted also from an uncovered portion of the aluminum alloy that has not been covered with the flux into the latent heat storage material. Accordingly, it is considered that, in the sample according to Comparative Example 2, the supercooling of the latent heat storage material was not maintained at −20° C.

TABLE 2

|  | Supercooling maintained period [hour] | The number of times supercooling was maintained for 12 hours in 5-cycle evaluations [time] |
|---|---|---|
| Example 1 | 12.0 | 5 |
| Example 2 | 12.0 | 5 |
| Comparative Example 1 | 2.8 | 0 |
| Comparative Example 2 | 0 | 0 |

TABLE 3

|  | Element content [at %] | | | | |
|---|---|---|---|---|---|
|  | Al | F | K | O | Na |
| Example 1 | 31.70 | 34.82 | 1.44 | 17.16 | 8.79 |
| Example 2 | 31.70 | 34.82 | 1.44 | 17.16 | 8.79 |
| Comparative Example 1 | 28.83 | 39.41 | 0.3 | 39.41 | — |
| Comparative Example 2 | 29.74 | 54.85 | 12.31 | — | — |

The invention claimed is:

1. A heat storage device comprising:
a water-soluble latent heat storage material; and
a container housing the latent heat storage material and formed of a main material being aluminum or an aluminum alloy, wherein:
the container has a joining portion and a first coating, the first coating covering at least the joining portion on an inner surface of the container,
on a surface of the first coating, a first element and fluorine are present, the first element being other than aluminum and having a lower ionization tendency than potassium, and
the first coating has a potassium-rich portion that is positioned closer to the joining portion in a thickness direction of the first coating than the surface is, the potassium-rich portion having a higher concentration of potassium on an atomic percentage basis than the surface.

2. The heat storage device according to claim 1, wherein a fluoride of the first element has a lower solubility in water at 20° C. than potassium fluoride.

3. The heat storage device according to claim 1, wherein the first element is at least one selected from the group consisting of sodium, calcium, magnesium, zinc, and iron.

4. The heat storage device according to claim 1, wherein
the container has, on the inner surface of the container, a second coating away from the joining portion, and
on a surface of the second coating, at least one selected from the group consisting of aluminum oxide, aluminum hydroxide, hydrated alumina, and a substance containing a second element and fluorine is present, the second element having a lower ionization tendency than potassium, the second element being a same element as the first element.

5. The heat storage device according to claim 4, wherein
on the surface of the second coating, the substance containing the second element and fluorine is present, and
a fluoride of the second element has a lower solubility in water at 20° C. than potassium fluoride.

6. The heat storage device according to claim 4, wherein
on the surface of the second coating, the substance containing the second element and fluorine is present, and
the second element is at least one selected from the group consisting of sodium, calcium, magnesium, zinc, and iron.

7. The heat storage device according to claim 1, wherein
the latent heat storage material contains, as a main component, a metal salt or a hydrate of a metal salt.

8. The heat storage device according to claim 7, wherein
the latent heat storage material contains sodium acetate as the main component.

9. The heat storage device according to claim 1, wherein
the container has, on the inner surface of the container, a second coating away from the joining portion, and
on a surface of the second coating, at least one selected from the group consisting of aluminum oxide, aluminum hydroxide, hydrated alumina, and a substance containing a second element and fluorine is present, the second element having a lower ionization tendency than potassium, the second element being a different element from the first element.

10. The heat storage device according to claim 9, wherein
on the surface of the second coating, the substance containing the second element and fluorine is present, and
a fluoride of the second element has a lower solubility in water at 20° C. than potassium fluoride.

11. The heat storage device according to claim 9, wherein
on the surface of the second coating, the substance containing the second element and fluorine is present, and
the second element is at least one selected from the group consisting of sodium, calcium, magnesium, zinc, and iron.

* * * * *